US010691291B2

(12) United States Patent
Bae et al.

(10) Patent No.: US 10,691,291 B2
(45) Date of Patent: Jun. 23, 2020

(54) METHOD AND APPARATUS FOR DISPLAYING PICTURE ON PORTABLE DEVICE

(71) Applicant: Samsung Electronics Co., Ltd., Gyeonggi-do (KR)

(72) Inventors: Daewoong Bae, Gyeonggi-do (KR); Kwanghyun Ko, Gyeonggi-do (KR); Yonghak Park, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 723 days.

(21) Appl. No.: 14/272,986

(22) Filed: May 8, 2014

(65) Prior Publication Data

US 2014/0351761 A1  Nov. 27, 2014

(30) Foreign Application Priority Data

May 24, 2013  (KR) .................. 10-2013-0059106
Aug. 14, 2013  (KR) .................. 10-2013-0096788

(51) Int. Cl.
*G06F 3/0481*  (2013.01)
*G06F 3/0488*  (2013.01)
*G06F 3/0484*  (2013.01)
*G06F 3/01*  (2006.01)

(52) U.S. Cl.
CPC .......... *G06F 3/04817* (2013.01); *G06F 3/017* (2013.01); *G06F 3/04842* (2013.01); *G06F 3/04886* (2013.01); *G06F 3/0488* (2013.01); *G06F 2203/04804* (2013.01)

(58) Field of Classification Search
CPC .... G06F 3/40484; G06F 3/017; G06F 3/0481; G06F 3/04883; G06F 3/041
See application file for complete search history.

(56) References Cited

U.S. PATENT DOCUMENTS

| 5,559,944 | A | * | 9/1996 | Ono | G06F 3/0418 715/841 |
| 5,586,244 | A | * | 12/1996 | Berry | G06F 3/0481 715/788 |
| 5,659,694 | A | * | 8/1997 | Bibayan | G06F 9/4443 715/788 |
| 6,326,978 | B1 | * | 12/2001 | Robbins | 345/654 |

(Continued)

FOREIGN PATENT DOCUMENTS

| CN | 102129312 | 7/2011 |
| CN | 102265242 | 11/2011 |

(Continued)

OTHER PUBLICATIONS

Faithe Wempen, "Microsoft PowerPoint 2010 Bible", 2010, Wiley Publishing, Inc., pp. i, ii, 271-274, 278.*

(Continued)

*Primary Examiner* — Nicholas Klicos
(74) *Attorney, Agent, or Firm* — The Farrell Law Firm, P.C.

(57) ABSTRACT

A method of displaying images on a screen of a portable device is provided. The method includes entering a mini-mode and displaying a mirror image, which is the same as an original image with a smaller size than that of the original image, in the mini-mode on the screen; detecting a touch input which is generated on the mirror image; and performing a function corresponding to the touch input.

32 Claims, 13 Drawing Sheets

(56) References Cited

U.S. PATENT DOCUMENTS

| | | | | |
|---|---|---|---|---|
| 7,164,432 B1* | 1/2007 | Amemiya | G06F 1/1616 | 345/649 |
| 7,760,995 B2* | 7/2010 | Kokubo | G06F 1/1626 | 396/287 |
| 8,769,431 B1* | 7/2014 | Prasad | G06F 3/048 | 715/764 |
| 9,134,877 B2* | 9/2015 | Gimpl | G06F 1/1616 | |
| 2002/0054054 A1* | 5/2002 | Sanbe | G06F 9/4443 | 715/700 |
| 2004/0261031 A1* | 12/2004 | Tuomainen | G06F 3/0482 | 715/739 |
| 2004/0268268 A1 | 12/2004 | Scheu et al. | | |
| 2005/0229108 A1* | 10/2005 | Sadek | G06F 9/4443 | 715/764 |
| 2007/0150810 A1* | 6/2007 | Katz | G06F 3/0481 | 715/229 |
| 2007/0162868 A1* | 7/2007 | Vignet | G06F 3/0481 | 715/781 |
| 2008/0005692 A1* | 1/2008 | Hoblit | G06F 3/048 | 715/781 |
| 2008/0068344 A1 | 3/2008 | Kim | | |
| 2009/0070670 A1* | 3/2009 | Kishi | G06F 3/04886 | 715/702 |
| 2009/0109187 A1* | 4/2009 | Noma | G06F 3/04883 | 345/173 |
| 2009/0160792 A1* | 6/2009 | Morohoshi | G06F 1/1626 | 345/173 |
| 2009/0303204 A1* | 12/2009 | Nasiri | A63F 13/06 | 345/184 |
| 2009/0307583 A1* | 12/2009 | Tonisson | G06F 17/211 | 715/246 |
| 2009/0327964 A1* | 12/2009 | Mouilleseaux | G06F 3/0482 | 715/834 |
| 2010/0085274 A1* | 4/2010 | Kilpatrick, II | G06F 1/1616 | 345/1.3 |
| 2010/0134423 A1* | 6/2010 | Brisebois | G06F 3/03547 | 345/173 |
| 2010/0156795 A1 | 6/2010 | Kim et al. | | |
| 2010/0241985 A1* | 9/2010 | Kim | G06F 3/04886 | 715/773 |
| 2010/0299436 A1* | 11/2010 | Khalid | G06F 1/1643 | 709/226 |
| 2011/0032202 A1* | 2/2011 | Aoyagi | G06F 1/1626 | 345/173 |
| 2011/0098024 A1 | 4/2011 | Shin et al. | | |
| 2011/0164057 A1* | 7/2011 | Prabhu | G06F 3/017 | 345/650 |
| 2011/0169749 A1 | 7/2011 | Ganey et al. | | |
| 2011/0214063 A1* | 9/2011 | Saul | G06F 3/0481 | 715/740 |
| 2011/0219331 A1* | 9/2011 | DeLuca | G06F 3/048 | 715/799 |
| 2012/0044164 A1 | 2/2012 | Kim et al. | | |
| 2012/0054671 A1* | 3/2012 | Thompson | G06F 3/038 | 715/784 |
| 2012/0056818 A1 | 3/2012 | Shafi et al. | | |
| 2012/0081400 A1* | 4/2012 | Schrock | G06F 1/1616 | 345/649 |
| 2012/0124515 A1* | 5/2012 | Li | G06F 3/0482 | 715/808 |
| 2012/0166989 A1* | 6/2012 | Brown | G06F 3/0486 | 715/768 |
| 2012/0225694 A1* | 9/2012 | Sirpal | G06F 1/1616 | 455/566 |
| 2012/0236018 A1 | 9/2012 | Kwon | | |
| 2012/0320081 A1 | 12/2012 | Kim et al. | | |
| 2012/0327106 A1* | 12/2012 | Won | G06F 3/04883 | 345/619 |
| 2013/0009903 A1* | 1/2013 | Shiota | G06F 3/04817 | 345/173 |
| 2013/0019172 A1* | 1/2013 | Kotler | G06F 3/0482 | 715/711 |
| 2013/0038544 A1 | 2/2013 | Park | | |
| 2013/0076594 A1* | 3/2013 | Sirpal | G06F 3/0488 | 345/1.3 |
| 2013/0104051 A1* | 4/2013 | Reeves | G06F 1/1616 | 715/748 |
| 2013/0117709 A1* | 5/2013 | McCormick | G06F 3/0481 | 715/788 |
| 2013/0117711 A1* | 5/2013 | Hayes | G06F 9/4443 | 715/800 |
| 2013/0132885 A1* | 5/2013 | Maynard | G06F 3/04842 | 715/777 |
| 2013/0132889 A1 | 5/2013 | Takayasu et al. | | |
| 2013/0145316 A1 | 6/2013 | Heo | | |
| 2013/0159925 A1* | 6/2013 | Leffert | G06F 3/04845 | 715/800 |
| 2013/0176212 A1* | 7/2013 | Nan | G06F 3/033 | 345/157 |
| 2013/0237288 A1* | 9/2013 | Lee | G06F 3/041 | 455/566 |
| 2013/0239031 A1* | 9/2013 | Ubillos | H04L 51/24 | 715/765 |
| 2013/0307783 A1* | 11/2013 | Park | G06F 3/04886 | 345/169 |
| 2013/0307797 A1* | 11/2013 | Taguchi | A61B 3/113 | 345/173 |
| 2013/0307801 A1* | 11/2013 | Nam | G06F 3/041 | 345/173 |
| 2014/0040826 A1* | 2/2014 | Wei | G06F 3/0488 | 715/810 |
| 2014/0160073 A1* | 6/2014 | Matsuki | G06F 3/0485 | 345/174 |
| 2014/0195957 A1* | 7/2014 | Bang | G06F 3/04812 | 715/773 |
| 2014/0289642 A1* | 9/2014 | Prasad | G06F 3/048 | 715/745 |
| 2014/0310646 A1* | 10/2014 | Vranjes | G06F 9/4443 | 715/788 |
| 2014/0335916 A1* | 11/2014 | Thorson | G06F 1/1626 | 455/566 |
| 2015/0084885 A1 | 3/2015 | Kawamoto | | |
| 2015/0116363 A1* | 4/2015 | Monte | G06T 3/60 | 345/659 |
| 2016/0062483 A1* | 3/2016 | Baldwin | H04W 4/21 | 345/156 |

FOREIGN PATENT DOCUMENTS

| | | |
|---|---|---|
| CN | 102810039 | 12/2012 |
| CN | 102866914 | 1/2013 |
| CN | 102929520 | 2/2013 |
| DE | 10016117 | 10/2001 |
| EP | 2 535 809 | 12/2012 |
| EP | 2 557 492 | 2/2013 |
| EP | 2 642 373 | 9/2013 |
| JP | 2013-218428 | 10/2013 |
| KR | 1020120129621 | 11/2012 |
| KR | 10-1250821 | 4/2013 |
| WO | WO 2012/077273 | 6/2012 |
| WO | WO 2013/018480 | 2/2013 |
| WO | WO 2013/150998 | 10/2013 |

OTHER PUBLICATIONS

Chinese Office Action dated Apr. 3, 2018 issued in counterpart application No. 201480029937.X, 18 pages.
Chinese Office Action dated Dec. 14, 2018 issued in counterpart application No. 201480029937.X, 15 pages.
European Search Report dated Jun. 14, 2019 issued in counterpart application No. 18205376.9-1221, 8 pages.
Korean Office Action dated Apr. 17, 2020 issued in counterpart application No. 10-2013-0096788, 12 pages.

* cited by examiner

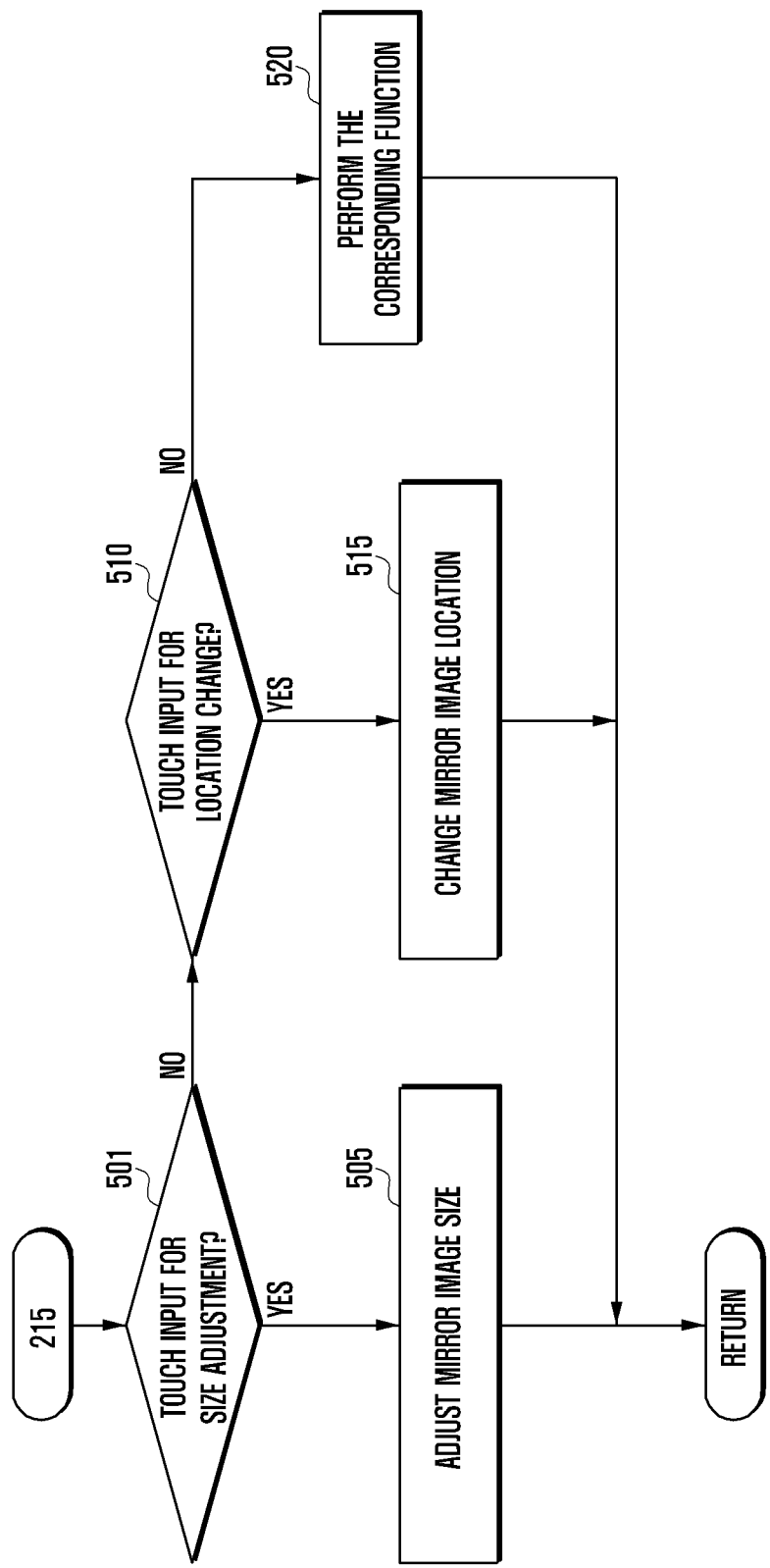

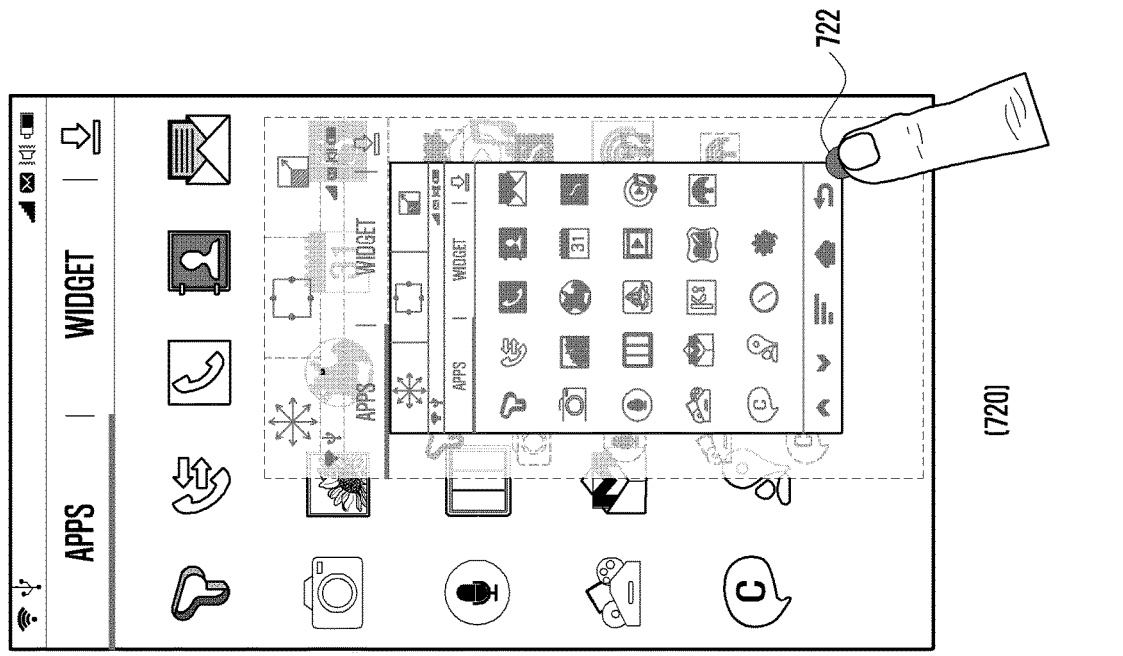
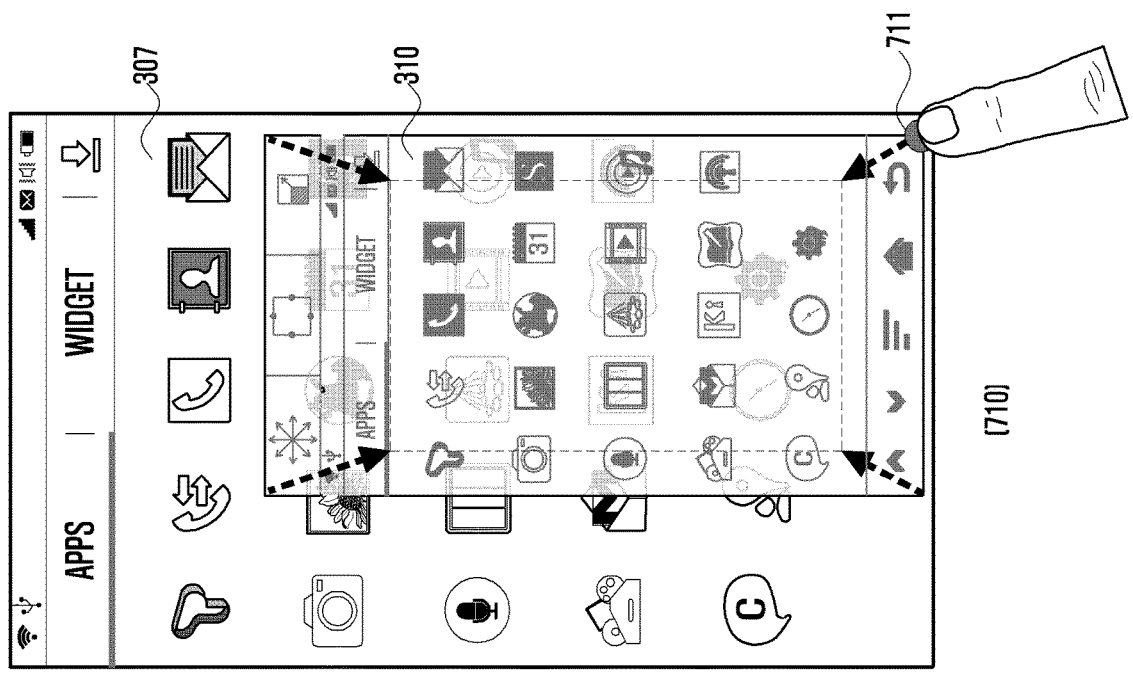
FIG. 7A

METHOD AND APPARATUS FOR DISPLAYING PICTURE ON PORTABLE DEVICE

PRIORITY

This application claims priority under 35 U.S.C. 119(a) to Korean Patent Applications filed in the Korean Intellectual Property Office on May 24, 2013 and Aug. 14, 2013, and assigned Serial Nos. 10-2013-0059106 and 10-2013-0096788, respectively, the contents of each of which are incorporated herein by reference.

BACKGROUND

1. Field of the Invention

The present invention generally relates to a method and an apparatus for displaying pictures on portable devices, and more particularly, to a method and an apparatus for displaying pictures on portable devices, which enable a user to manipulate the portable devices using only one hand.

2. Description of the Related Art

Thanks to the recent development of information technology, portable device are able to support various functions such as multimedia data performance, web surfing, communication, financial transactions, and the like. With such various functions supported by the portable device, a user prefers a large screen. Based on such a trend, recent portable devices tend to be enlarged.

Meanwhile, as the portable device becomes larger, it may be inconvenient to the user because the screen of portable device is too big that it is difficult for the user to grip and manipulate the portable device adopting a big screen with only one hand. Therefore, the user usually grips the portable device with two hands and manipulates a touch screen using two thumbs. Alternatively, the user may manipulate the touch screen with one hand while gripping the portable device with the other hand. However, the above mentioned methods require the user to use two hands. In addition, when the user is unable to use one hand, the portable device having a big screen makes it difficult for the user to touch the end area of the screen.

SUMMARY

The present invention has been made to address at least the above-mentioned problems and/or disadvantages and to provide at least the advantages described below. Accordingly, an aspect of the invention is to provide a method and an apparatus which enables a user to conveniently manipulate a portable device having a big screen with only one hand by providing a translucent mirror image capable of adjusting the size and location of images on the screen.

In accordance with an aspect of the present invention, a method of displaying images on a screen of a portable device is provided. The method includes entering a mini-mode and displaying a mirror image, which is the same as an original image with a smaller size than that of the original image, in the mini-mode on the screen; detecting a touch input which is generated on the mirror image; and performing a function corresponding to the touch input.

In accordance with another aspect of the present invention, an apparatus of displaying images on a screen of a portable device is provided. The apparatus includes a touch panel configured to detect a touch input for performing a function in a mini-mode; a display panel configured to display a mirror image, which is the same as an original image with a smaller size than that of the original image, in the mini-mode on the screen; a memory configured to store setup information of the mini-mode; and a control unit configured to enter the mini-mode and performs a function corresponding to the touch input.

BRIEF DESCRIPTION OF THE DRAWINGS

The above and other aspects, features, and advantages of the present invention will be more apparent from the following detailed description taken in conjunction with the accompanying drawings, in which:

FIG. 5 is a flowchart illustrating a detailed process for changing a setup of a mirror image according to an embodiment of the present invention;

FIGS. 7A and 7B illustrate a change of setup of a translucent mirror image according to an embodiment of the present invention.

DETAILED DESCRIPTION OF EMBODIMENTS OF THE PRESENT INVENTION

Figure 1:
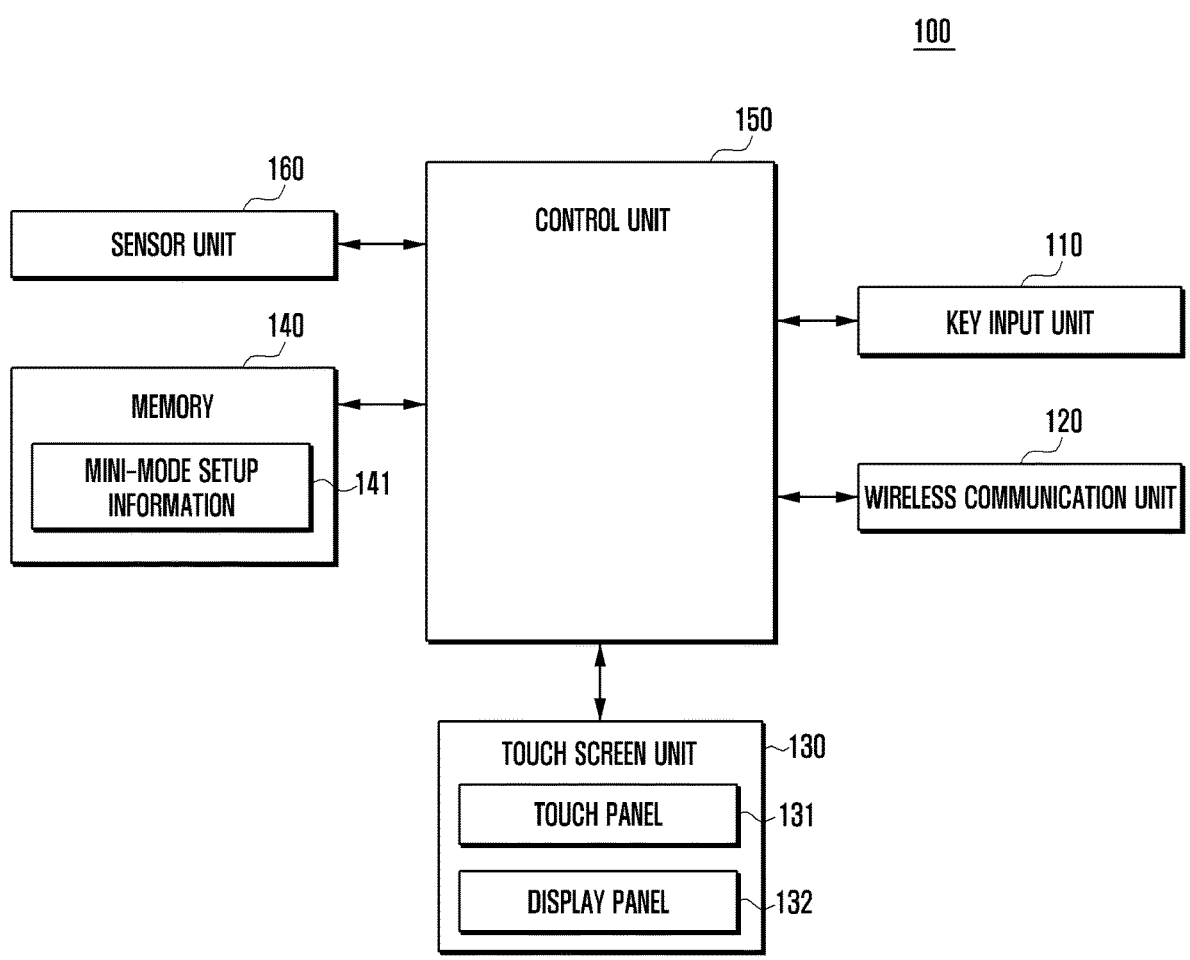
FIG. 1 is a block diagram of a portable device according to an embodiment of the present invention.

Hereinafter, embodiments of the present invention will be described in detail with reference to the accompanying drawings. It should be noted that the same elements will be designated by the same reference numerals although they are shown in different drawings. Further, in the following description of the present invention, a detailed description of known functions and configurations incorporated herein will be omitted when it may make the subject matter of the present invention unclear.

Meanwhile, embodiments of the present invention shown and described in this specification and the drawings correspond to specific examples presented in order to easily explain technical contents of the present invention, and to help comprehension of the present invention, but are not intended to limit the scope of the present invention. It is obvious to those skilled in the art to which the present invention pertains that other modified embodiments on the basis of the spirit of the present invention besides the embodiments disclosed herein can be carried out.

According to an embodiment of the present invention, a portable device may be operated in two modes of images, i.e., a full mode and a mini-mode with respect to supported pictures.

The term "full mode" means a mode where a performed image is displayed on the full screen of the portable device. That is, the full mode is a normal display mode in which the image is displayed through the whole area of the screen of the portable device. Hereinafter, the image displayed in the full mode is referred to as an original image.

The term "mini-mode" denotes a mode where the original image is reduced in size to be thereby displayed on the partial area of the screen. Hereinafter, the reduced image displayed in the mini-mode is referred to as a mirror image. The mirror image may be displayed by itself or together with the original image. When the mirror image is displayed together with the original image, the original image may be overlaid with the mirror image that is in the translucent window. Also, when displaying the mirror image without the original image, the mirror image may be displayed to be opaque.

The term "overlaying" means a state in which the original image is covered by the translucent mirror image.

The present invention enables a user to manipulate a big screen with only one hand by providing a mirror image, so that the user is able to conveniently operate the portable device.

Hereinafter, the configuration of a portable device and performance of a control method according to an embodiment of the present invention will be described in detail with reference to the accompanying drawings.

FIG. 1 is illustrates a configuration of a portable device according to an embodiment of the present invention.

Referring to FIG. 1, the portable device 100 includes a key input unit 110, a wireless communication unit 120, a touch screen unit 130, a memory 140, a control unit 150 and a sensor unit 160. The touch screen unit 130 includes a touch panel 131 and a display panel 132.

The key input unit 110 receives a key input by a user in order to control the portable device 100. When the portable device 100 provides a full touch screen, the key input unit 110 includes keys only for power on/off, volume adjustment and a back function, which are provided at one side of the portable device 100. The key input unit 110 receives a key input that is one of methods capable of entering the mini-mode in accordance with an embodiment of the present invention. For example, the key input unit 110 is provided with a predetermined key (e.g., a mini-mode key) for entering the mini-mode and receives an input by the predetermined key. Alternatively, the key input unit 110 may receive an input by a combination of some function keys (e.g., home key+volume key) for entering the mini-mode.

The wireless communication unit 120 performs a function of wireless communication of the portable device 100. The wireless communication unit 120 may include a radio frequency (RF) transmitter for modulating and amplifying the frequency of a signal to be transmitted, and a RF receiver for low-noise-amplifying a received signal and demodulating the frequency thereof. Also, the wireless communication unit 120 may include a mobile communication module, a digital broadcasting module and a near field communication module. The wireless communication unit 120 performs a function of wireless communication under the mini-mode in the portable device 100.

The touch screen unit 130 includes a touch panel 131 and a display panel 132. The touch screen unit 130 may be configured to have the touch panel 131 positioned in front of the display panel 132, or to combine the panels integrally, but is not limited thereto, and may have various configurations.

The touch panel 131 is a device for detecting a touch input by the user. The touch panel 131 may be implemented with a technology of capacitive overlay, resistive overlay, infrared beam, or the like. Also, any technologies to detect a contact or pressure of an object other than the above may be applied to the touch panel 131. The touch panel 131 receives a user's touch input to thereby detect a touch point. The touch panel 131 detects the generation of a user's touch gesture for entering the mini-mode and transmit the generated touch signal to a control unit 150 according to an embodiment of the present invention. The touch panel 131 also detects a user's touch input (e.g., a long touch, or a drag) for adjustment of the location and size of the mirror image. In addition, the touch panel 131 detects a touch input (e.g., a tap) for performing a predetermined function on the mirror image. The event for entering the mini-mode are not limited to the key input, while the touch panel 131 may receive a touch event by the user for entry to mini-mode. For example, the touch panel 131 receives a touch gesture having a path along a semi-circle from one side of the screen.

The display panel 132 may be implemented by Liquid Crystal Displays (LCDs), Organic Light Emitting Diodes (OLEDs), and Active Matrix Light Emitting Diodes (AMOLEDs). The display panel 132 provides the user with various visual information such as menus, input data and setup information of functions of the portable device 100. The display panel 132 displays an image in at least one of the full mode and the mini-mode according to an embodiment of the present invention. At this time, the display panel 132 may display the original image in the full mode on the full screen, and the mirror image in the mini-mode on the partial area of the screen, respectively. The mirror image may provide the same contents as those in the original image. Also, under the mini-mode, the display panel 132 displays outer keys such as a volume key, a home key, a back key and a menu key, which are provided in the key input unit 110, on one side of the mirror image, and displays a mini-mode deactivation key, a movement key and a size adjustment key on the other side of the mirror image. Also, the display panel 132 may display images resulting from the performance of a function corresponding to a preset input event by the user in the mini-mode.

The memory 140 stores programs and data necessary for operating the portable device 100. The memory 140 may store start-up programs, at least one operating system and applications. The operating system provides an interface between hardware and applications, and between applications, and administrates a resource of a computer such as a Central Processing Unit (CPU), a Graphics Processing Unit (GPU), a main memory, the memory 140, or the like. The applications are classified to embedded applications and third party applications.

The memory 140 stores an application for performance of the mini-mode. Also, the memory 140 stores setup information of the mini-mode 141 in the portable device 100. The setup information of the mini-mode 141 may include setup information (e.g., a kind of touch gesture requesting the entry/termination of mini-mode) for entering the mini-mode and termination thereof, and other setup information (e.g., the size, location and transparency of the mirror image) of the mini-mode. In addition, the memory 140 stores data necessary for performance of a function and a display in the mini-mode, and data related to the input from the touch panel 131 and the key input unit 110.

The control unit 150 controls the general operations of the portable device 100.

The control unit 150 includes at least one CPU. As well known in the art, the CPU is a core control unit of a computer system, which performs calculation and comparison of data, interpretation and performance of instructions, or the like.

The control unit 150 includes a main memory, for example, a Random Access Memory (RAM). The main memory stores all kinds of programs, for example, a start-up program, an operating system and applications, loaded from the memory 140. Also, the control unit 150 includes a cache memory which temporarily stores data to write on the memory 140, and data read from the memory 140.

The control unit 150 identifies an input of a preset event in relation to entering the mini-mode, and controls the process of performance of the full mode or the mini-mode in response to the preset event. The preset event may be a touch event, a key input, or a motion like shaking or tilting of the portable device 100. Also, the control unit 150 controls the performance of applications in the mini-mode, and a conversion of the application performed under the full mode into the mini-mode, or vice versa. For example, the control unit 150 controls the display panel 132 in a manner that turning the screen staying vertical in the mini-mode to the horizontal position to terminate the mini-mode and to thereby display images in the full mode. Also, the control unit 150 controls the display panel 132 to terminate the mini-mode and enter the full mode in response to the input of a preset event. The preset event for termination of the mini-mode may be the same as the event for entering the mini-mode.

The control unit 150 controls the setup of location and size of the mirror image displayed on the screen in the mini-mode according to a user's touch event. In addition, when the setup of location and size of the mirror image is changed, the control unit 150 controls the display panel 132 to display the changed mirror image.

The control unit 150 controls various operations in relation to a general function of the portable device 100. For example, the control unit 150 controls the operation of performance of a predetermined application and other functions (e.g., setup of system) and the display of the same. Also, when a communication application is performed in the mini-mode, the control unit 150 controls a process related to transmission and reception of data through the wireless communication unit 120.

The sensor unit 160 may include various sensors, for example, geomagnetic sensors, acceleration sensors and gyro-sensors, for detecting a motion input. Here, the geomagnetic sensor, the acceleration sensor and the gyro-sensor detect a motion, i.e., movement and rotation of the portable device, which is generated by the user, and give an output to the control unit 150. More specifically, the gyro-sensor detects directions of six-axes (i.e., X-axis of up and down, Y-axis of left and right, Z-axis of back and forth) and gives an output to the control unit 150. The acceleration sensor detects an acceleration of the portable device 100 to give an output to the control unit 150. The geomagnetic sensor has a role in correcting directional errors of the gyro-sensor and detecting a rotational acceleration by correcting the acceleration sensor. The sensor unit 160 may detect the generation of a preset motion (e.g., tilting, rotation, shaking, etc.) for entering the mini-mode or deactivation of the mini-mode.

Figure 2:
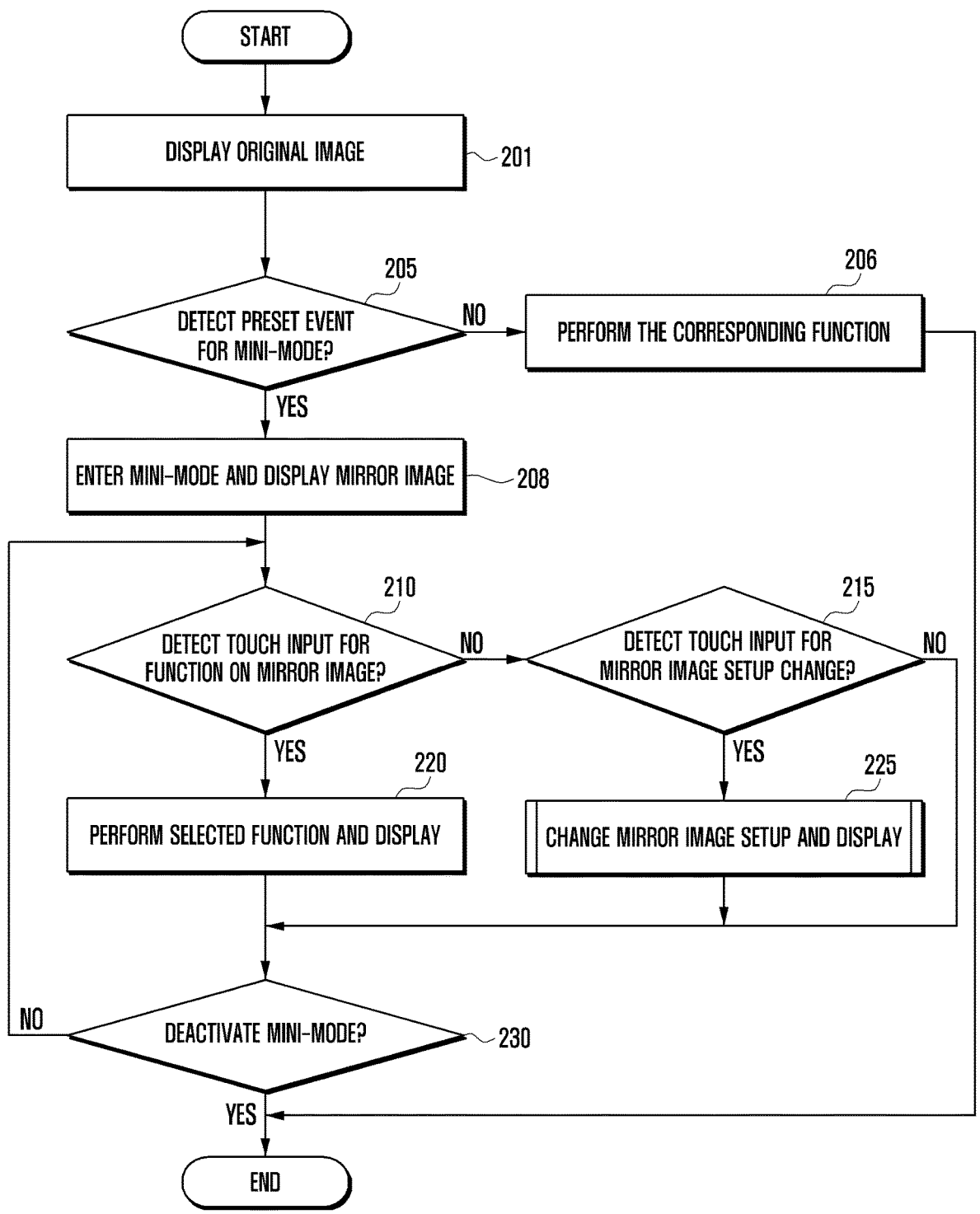
FIG. 2 is a flowchart illustrating a process for performing a mini-mode in a portable device according to an embodiment of the present invention.

FIG. 2 is a flowchart illustrating a process for performing the mini-mode according to an embodiment of the present invention.

Referring to FIG. 2, in step 201, the control unit 150 displays an original image in the full mode on the touch screen unit. After that, the control unit 150 determines whether a preset event for requesting the mini-mode is detected in step 205. The preset event for requesting the mini-mode may be carried out, for example, by an input of a predetermined key (i.e., a mini-mode key) dedicated to perform the mini-mode. Alternatively, the preset event for requesting the mini-mode may be achieved by a combination of the typical keys (home key+volume key). Also, a touch gesture may be the preset event for requesting the mini-mode. In this regard, the touch gesture may be confined to a preset touch gesture (e.g., dragging) which satisfies a predetermined limit in terms of at least one of the movement speed and the movement distance of the touch starting from an edge of the screen, in order to make it different from the normal touch gesture irrelevant to requesting the mini-mode. Also, a motion of shaking or tilting the portable device may be used as a preset event dedicated to request the mini-mode.

When the event for requesting the mini-mode is not detected in step 205, the control unit 150 performs the function corresponding to the key input other than the preset event for requesting the mini-mode in step 206. For example, when a volume key input is detected, the control unit 150 carries out the adjustment of volume corresponding to the volume key. On the contrary, when the preset event for requesting the mini-mode is detected in step 205, the control unit 150 enters the mini-mode and controls the display panel 132 to display a mirror image in step 208. At this time, the mirror image has the same contents as those of the original image in the full mode, but is smaller than the original image.

After the entering the mini-mode, the control unit 150 determines whether a touch input on the mirror image for performing a function (e.g., performance of application) is detected in step 210.

When the touch input on the mirror image for performing a function is detected, the control unit 150 performs a function corresponding to the location and item of the touch input to thereby display the results on the touch screen in step 220. The touch may encompass all kinds of touch events, such as a tap, a long touch, a drag, and a scroll, performed in the full mode.

The control unit 150 determines whether the mini-mode is to be deactivated in step 230. Deactivation of the mini-mode may be implemented by the input of a preset event (e.g., mini-mode key input, home key+volume key input) for deactivation of mini-mode. Alternatively, the mini-mode may be deactivated by selecting a termination icon displayed on one side of the mirror image. When the instruction to deactivate the mini-mode is not given, the control unit 150 returns to the step 210 to repeat the process. That is, when the instruction for deactivation of the mini-mode is not given, the control unit 150 detects the touch input on the mirror image again and performs the corresponding functions in response to the touch input.

When the touch input on the mirror image for performing a function is not detected, the control unit 150 determines whether a touch input for changing the setup of mirror image is detected in step 215. When the touch input for changing the setup of the mirror image is detected, the control unit 150 changes the setup of the mirror image and controls the display panel 132 to display the image resulting from the changed setup in step 225. For example, the control unit 150 changes the size or location of the mirror image according to a user's touch input. In addition, the setup items of the mirror image may further include a transparency.

When the touch input for changing the setup of the mirror image is not detected in step 215, or after the step 225, the control unit 150 may determine whether the mini-mode is to be deactivated in step 230. The mini-mode may be deactivated, for example, by performing the touch gesture for entering into the mini-mode again on the mirror image.

Alternatively, the mini-mode may be deactivated by selecting a termination key located at one side of the mirror image, or by making a motion of shaking or tilting the portable device 100. When an event for deactivation of the mini-mode is not detected, the control unit 150 maintains the mini-mode. Subsequently, the control unit 150 repeats the process from the step 210. On the other hand, when the event for deactivation of the mini-mode is detected, the control unit 150 deactivates the mini-mode and terminates the process.

Although not shown in the drawings, the mini-mode may be deactivated temporarily to be converted to the full mode. An event for temporary deactivation of the mini-mode may be a motion of, for example, turning the device staying vertical to a horizontal position. Also, when predetermined media data, such as a movie and an image, is performed according to a user's setup, the mini-mode may be temporarily deactivated. In addition, when the event for temporary deactivation of the mini-mode terminates (e.g., when the device having been turned to the horizontal position returns to the original vertical position, or when the performance of the predetermined media data terminates), the full mode may be converted to the mini-mode again.

Figure 3A:
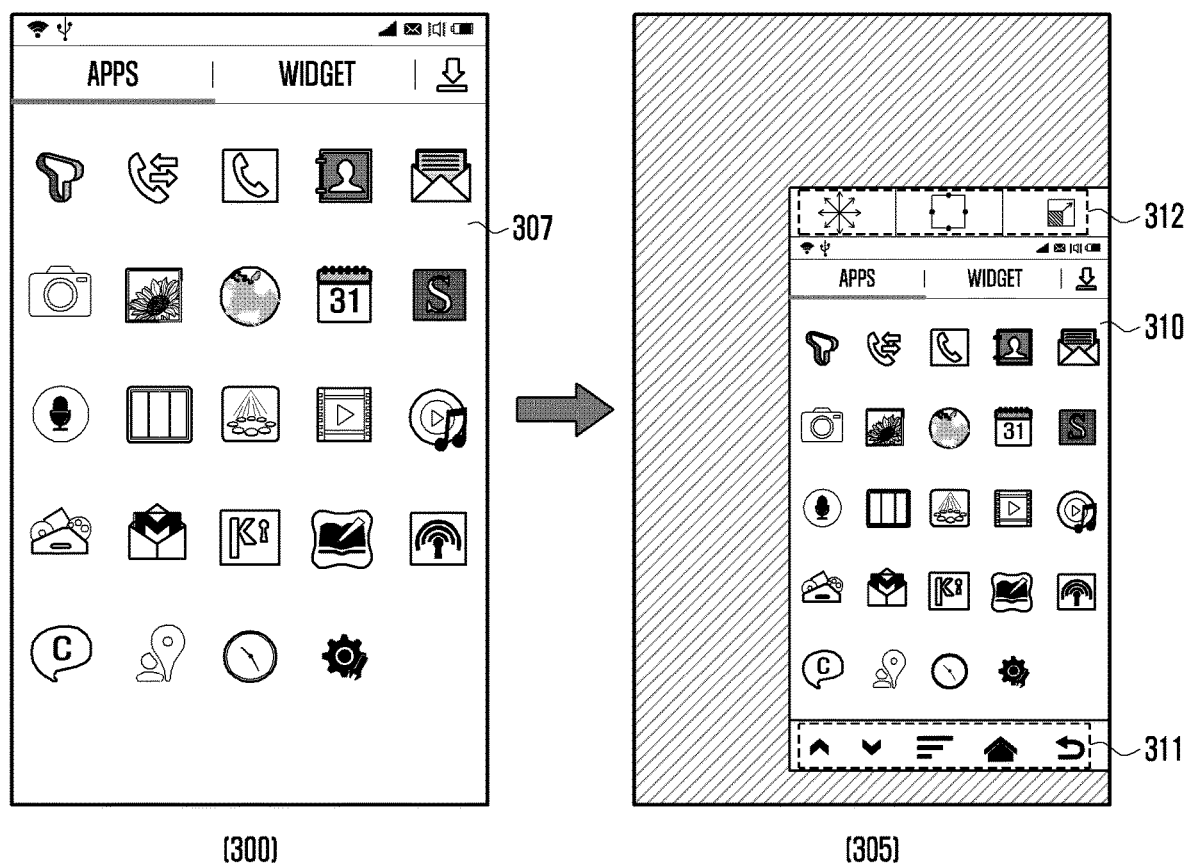
FIGS. 3A and 3B illustrate a mirror image in a mini-mode according to an embodiment of the present invention.
Figure 3B:
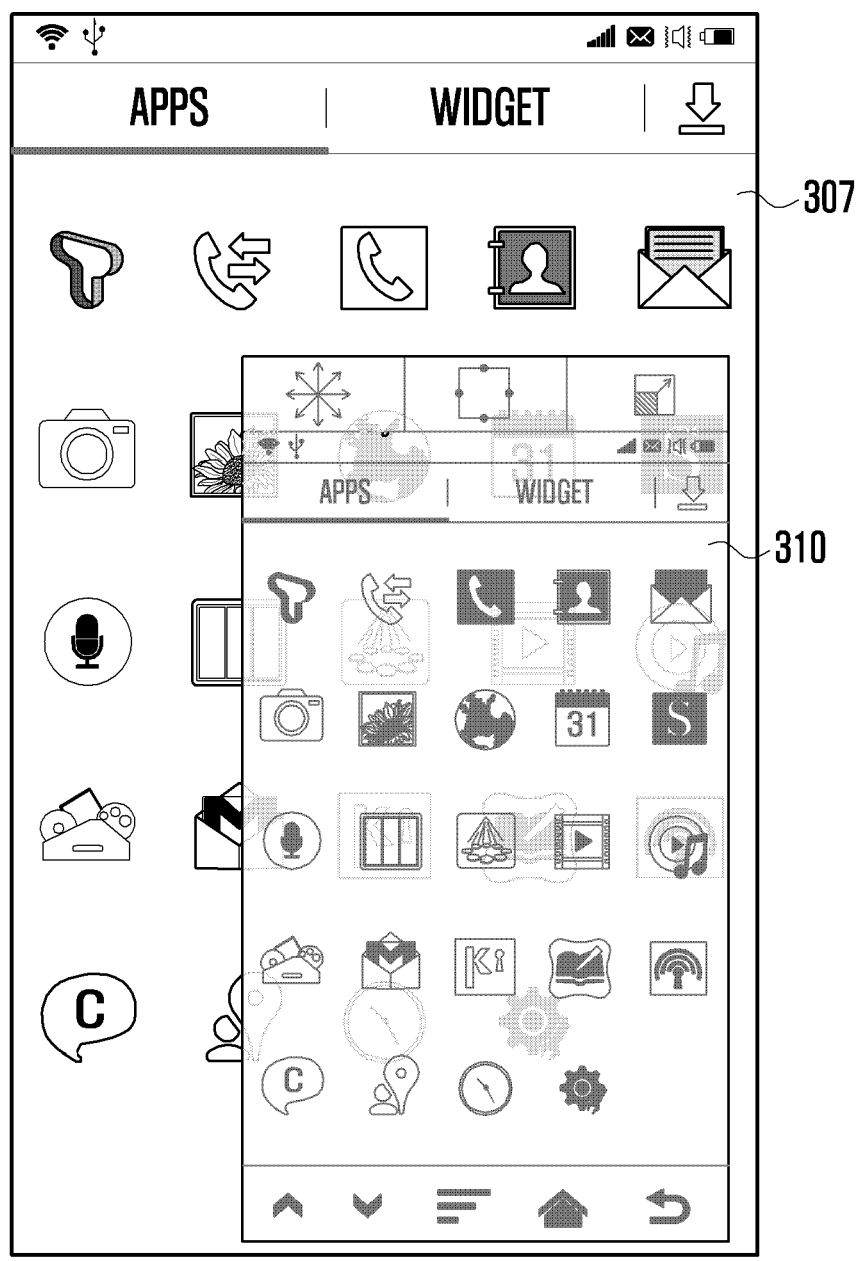

FIGS. 3A and 3B illustrate a mirror image in the mini-mode according to an embodiment of the present invention. A picture 300 in FIG. 3A indicates an original image 307 in the full mode. When the preset event for requesting the mini-mode in the full mode is detected, the control unit 150 enters the mini-mode displaying the mirror image 310 as indicated in a picture 305. At this time, the mirror image 310 is displayed to be opaque on the partial area of the screen not having a background image as shown in the picture 305. Also, outer key icons 311 may be displayed on one side of the mirror image 310. The outer key icons 311 includes, for example, a volume key, a menu key, a home key and a back key, which are displayed in a row from the left to the right as shown in the picture 305. As mentioned above, the outer key icons 311 may be displayed on one side (e.g., at the bottom of the mirror image) of the mirror image 310 in order to facilitate the input of outer function keys by the user under the mini-mode. Also, setup change icons 312 for changing the setup of the mirror image 310 are displayed on the upper end of the mirror image 310 as shown in the picture 305. For example, icons, which indicate a movement key for moving the mirror image, a size adjustment key for adjusting the size of the mirror image, and a mini-mode deactivation key for deactivating the mini-mode, are displayed on one side (e.g., the upper end) of the mirror image 310. However, the setup change icons 312 displayed on one side of the mirror image 310 are not limited to the above, and may further include, for example, an adjustment key for the transparency of the mirror image 310. Although not shown in the drawings, when the mirror image 310 is opaque while the original image 307 is not displayed to be overlaid, predetermined icons may be displayed on the background of the mirror image 310. The predetermined icons may be, for example, icons of applications which are being performed in the background, or icons of applications frequently used by the user.

FIG. 3B illustrates a screen when the original image is overlaid with the translucent mirror image 310. The mirror image 310 may be displayed to be translucent on the screen as shown in FIG. 3B, so that the original image 307 is mirrored in the mirror image 310.

Figure 4A:
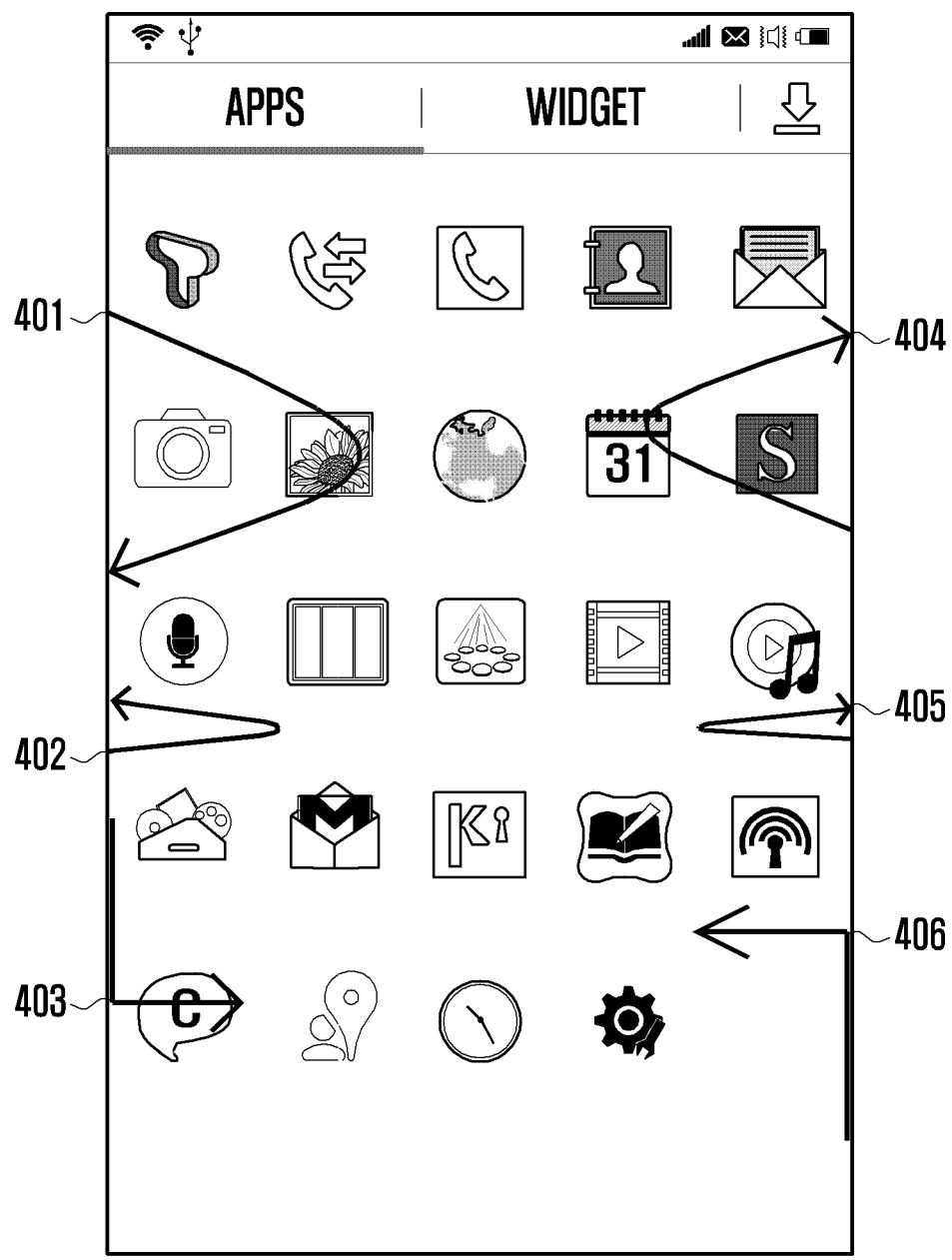
FIG. 4A illustrates examples of touch gestures for entering a mini-mode according to an embodiment of the present invention.
Figure 4B:
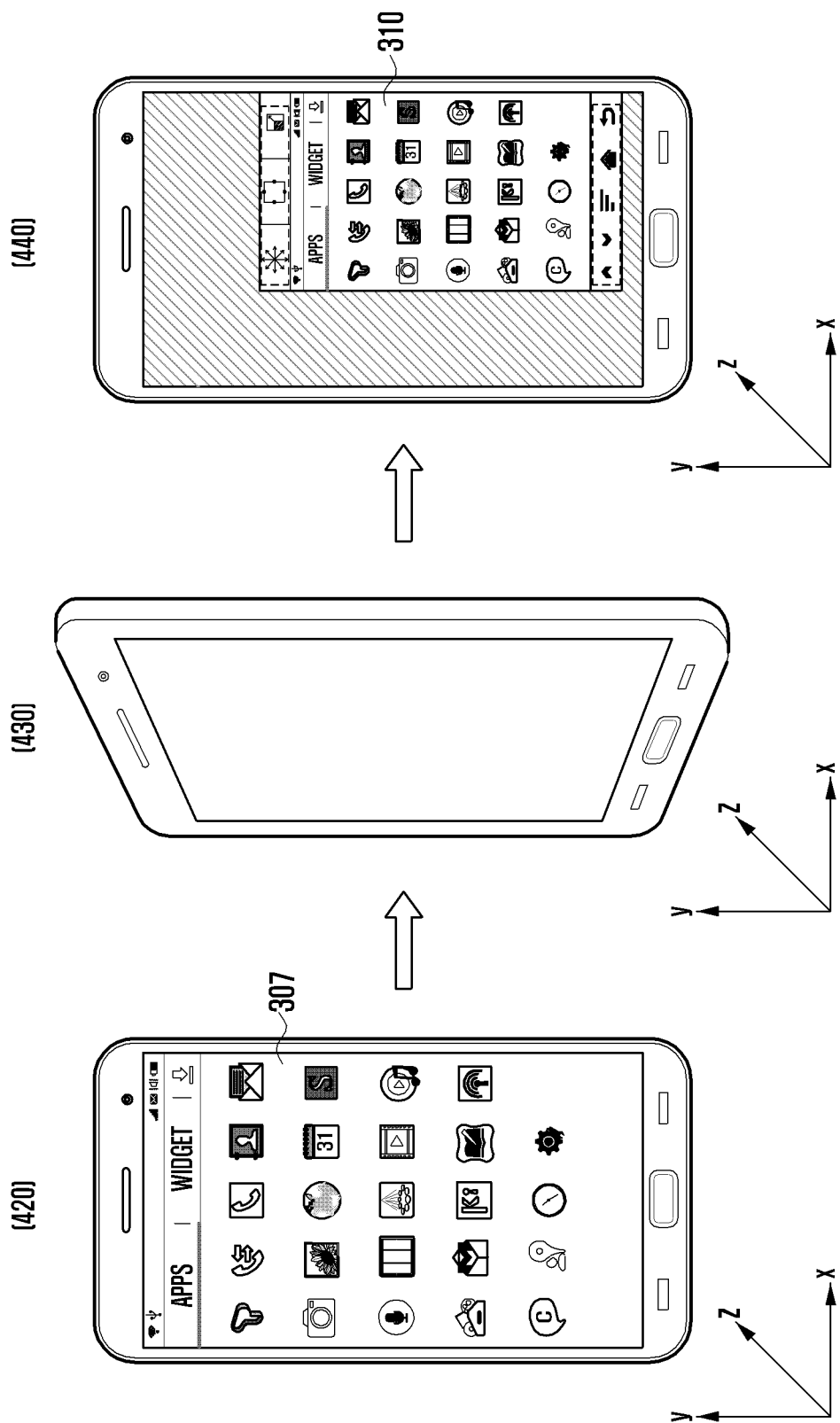
FIGS. 4B and 4C illustrate a motion for entering a mini-mode according to an embodiment of the present invention.
Figure 4C:
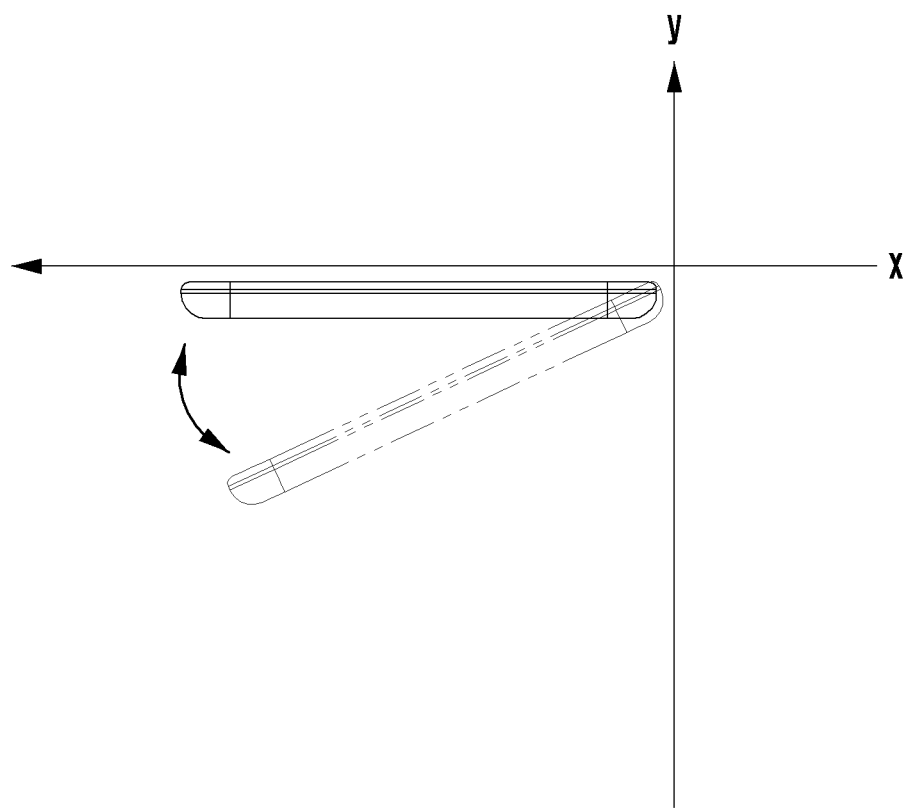

Hereinafter, the event for entering into the mini-mode will be described in detail with reference to FIGS. 4A to 4C. FIG. 4A illustrates examples of touch gestures for entering the mini-mode according to an embodiment of the present invention. FIGS. 4B and 4C show a motion for entering the mini-mode according to an embodiment of the present invention.

At least one of touch gestures for entering the mini-mode shown in FIG. 4A may be selected as a touch gesture for entering the mini-mode. The touch gesture for entering the mini-mode may be confined to a motion of touching the edge of the screen and dragging at a speed higher than a predetermined value, in order to make it different from a touch gesture for performing other functions. Referring to FIG. 4A, the reference numeral 401 indicates a gesture of touching one point of the left edge of the screen and dragging clockwise along a semi-circle. The reference numeral 402 indicates a gesture of touching one point of the left edge, and dragging to the right more than predetermined distance and then returning to the original touch point. The reference numeral 403 indicates a gesture of touching one point of the left edge and dragging downward and then to the right. The reference numeral 404 indicates a gesture of touching one point of the right edge and dragging clockwise along a semi-circle. The reference numeral 405 indicates a gesture of touching one point of the right edge, and dragging to the left more than predetermined distance and then returning to the original touch point. The reference numeral 406 indicates a gesture of touching one point of the right edge and dragging upward and then to the left. All kinds of touch gestures as described above may be selected as a touch gesture for requesting the mini-mode. Alternatively, a certain gesture other than the various gestures as shown in FIG. 4A may be a touch gesture for requesting the mini-mode.

In addition to the touch gestures, a motion may be adopted as the event for entering the mini-mode. The example of the motion is illustrated in FIG. 4B. Here, the z-axis is oriented to the ground in FIG. 4B. A picture 420 of FIG. 4B shows a screen of a portable device 100 on which the original image 307 is displayed only. Also, the sensor unit 160 may detect a tilting motion that one side of the portable device 100 tilts toward the ground as shown in a picture 430. The control unit 150 determines to enter the mini-mode by the preset motion as above, and the preset motion may further include, for example, a shaking (e.g., shaking of the portable device). Also, as a result of the tilting motion, the control unit 150 determines to enter the mini-mode to thereby allow the mirror image 310 to be displayed on the partial area of the screen as shown in a picture 440.

FIG. 4C illustrates a portable device 100 viewed from the side with a screen facing upward in order to additionally describe a tilting motion of the portable device. Provided that the x-axis is parallel to the ground and the y-axis is perpendicular to the ground to extend in the opposite direction of the ground, the portable device 100 of FIG. 4C makes a motion of tilting one side thereof toward the ground and then returning to the original position. When the sensor unit 160 detects such a motion of the portable device 100, the control unit 150 enters the mini-mode. However, the preset motion for entering the mini-mode is not limited to the tilting motion, but may further include a shaking motion (e.g., shaking the portable device).

FIG. 5 is a flowchart illustrating a detailed process of changing a setup of the mirror image according to an embodiment of the present invention. FIG. 5 also illustrates the step 225 in FIG. 2 in more detail.

After the step 215 of FIG. 2, the control unit 150 determines whether the touch input is for adjusting the size of the mirror image 310 in step 501. The touch input for adjustment of size may be implemented in a manner of, for example, touching the corner point of the mirror image 310 and dragging along a diagonal line to thereby adjust the size of the mirror image 310. Alternatively, when a size adjustment key displayed on one side of the mirror image 310 is selected, the control unit 150 adjusts the size of the mirror image 310 to display. When the selection of the size adjustment key displayed on one side of the mirror image 310 is confirmed, the control unit 150 performs a size adjustment mode. In the size adjustment mode, the control unit 150 displays an image adjustment box on the border of the mirror image 310. Also, the user may select one of adjustment points displayed on the image adjustment box and perform a touch gesture (e.g., dragging) in the direction of reduction/enlargement. When it is determined that the touch input is for adjustment of the size of the mirror image 310, the control unit 150 adjusts the size of the mirror image 310 and displays the resized mirror image on the screen in step 505.

On the contrary, if it is determined that the touch input is not for the adjustment of size of the mirror image 310, the control unit 150 determines whether the touch input is for the movement of the mirror image 310 in step 510. The touch input for movement of the mirror image 310 may be achieved by, for example, touching (or long-touching) a movement key displayed on one side of the mirror image 310, or touching (or long-touching) the border area of the mirror image 310. When it is determined that the touch input is for movement of the mirror image 310, the control unit 150 changes the location of the mirror image 310 to thereby display the relocated mirror image in step 515. When the touch input (e.g., a touch input on the predetermined area and a movement gesture) for movement is confirmed, the control unit 150 may perform a movement mode. The user may be informed the activation of the movement mode using a specific means (e.g., oscillation mode) upon entering the mini-mode. Also, the control unit 150 may control the display panel 132 to move the mirror image 310 in response to user's touch input and gesture to thereby display the same in the movement mode. After that, the control unit 150 may terminate the step 225 of FIG. 2.

When it is determined that the touch input is not for movement of the mirror image 310, the control unit 150 performs a function corresponding to the touch input in step 520. For example, it may be performed to change the setup like adjustment of transparency of the mirror image 310 in step 520.

Figure 6A:
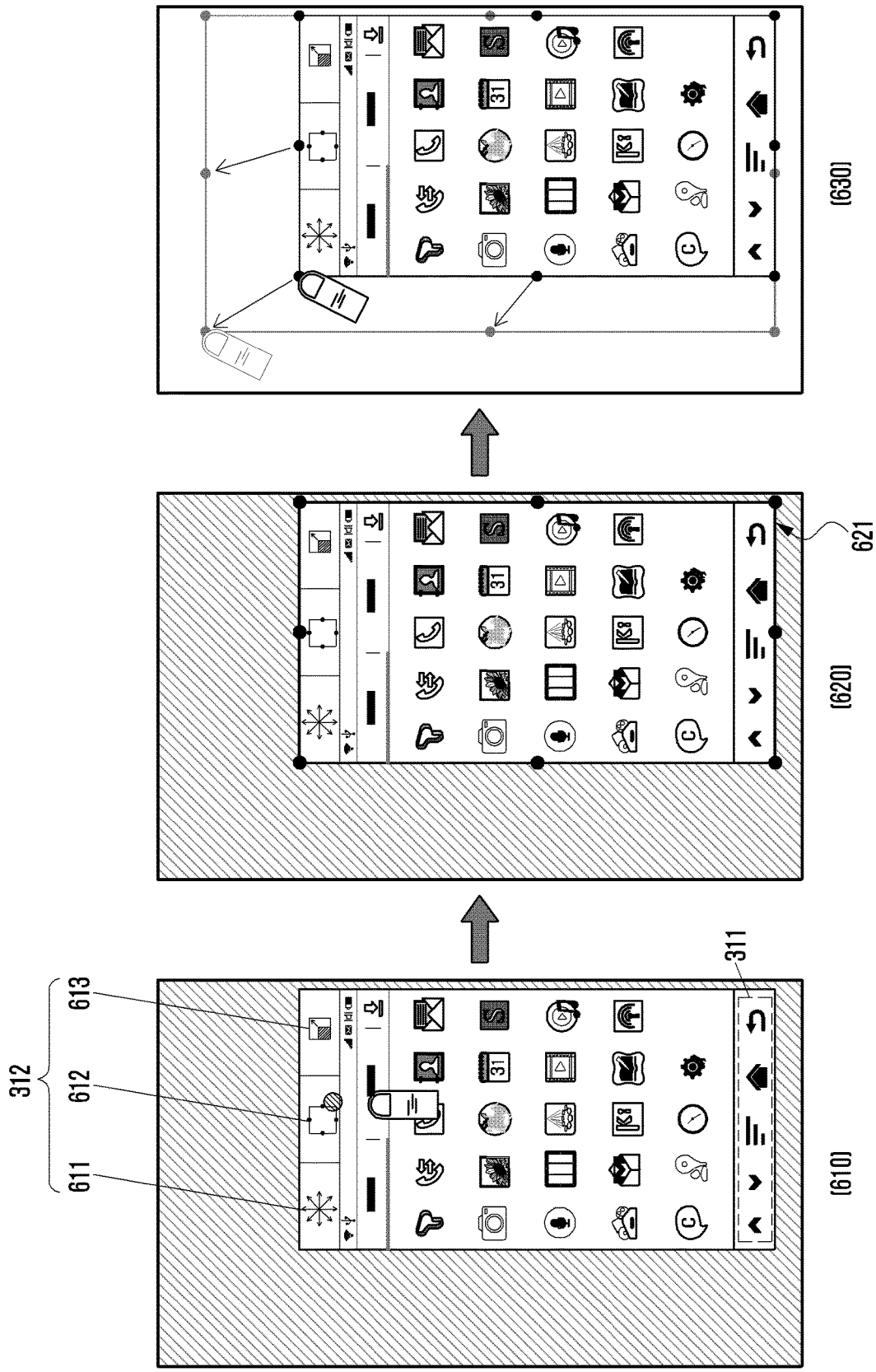
FIGS. 6A and 6B illustrate a change of setup of an opaque mirror image according to an embodiment of the present invention.
Figure 6B:
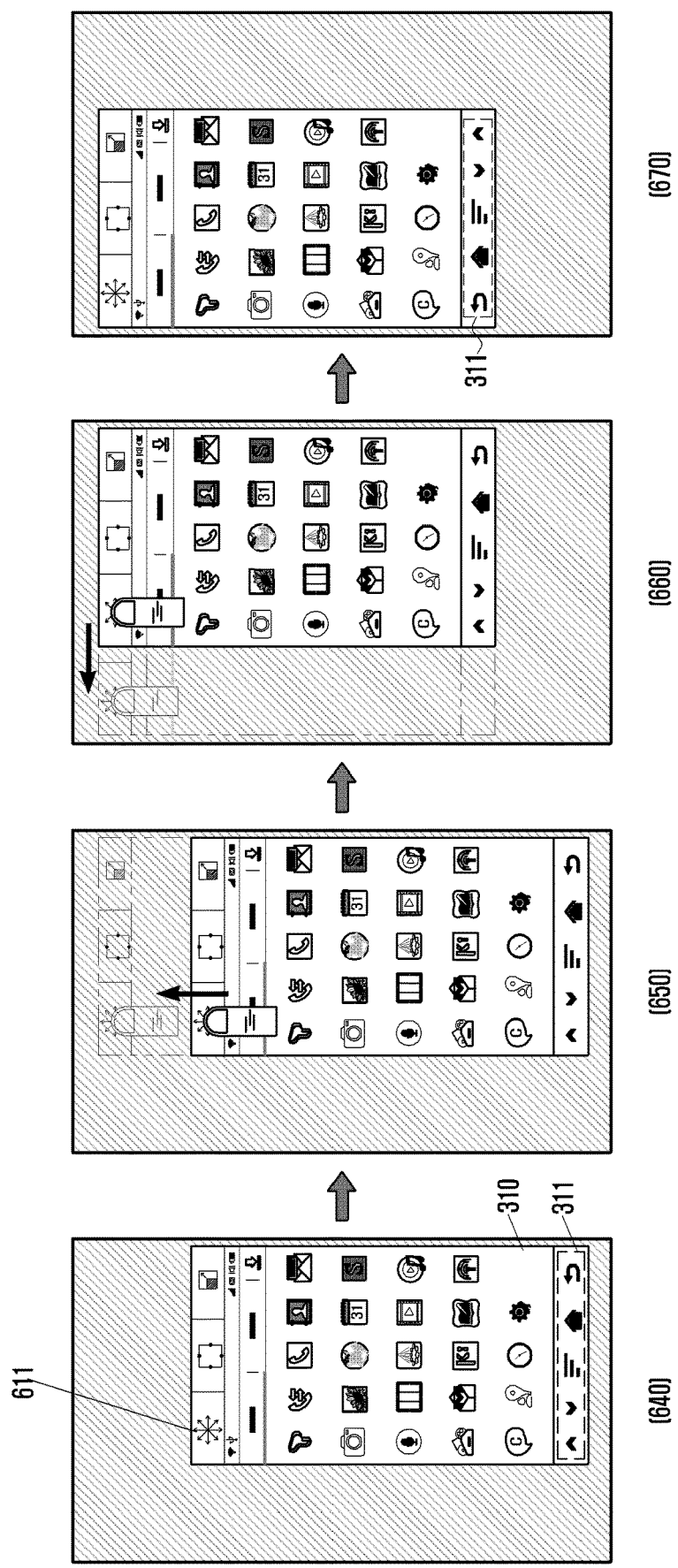
Figure 7B:
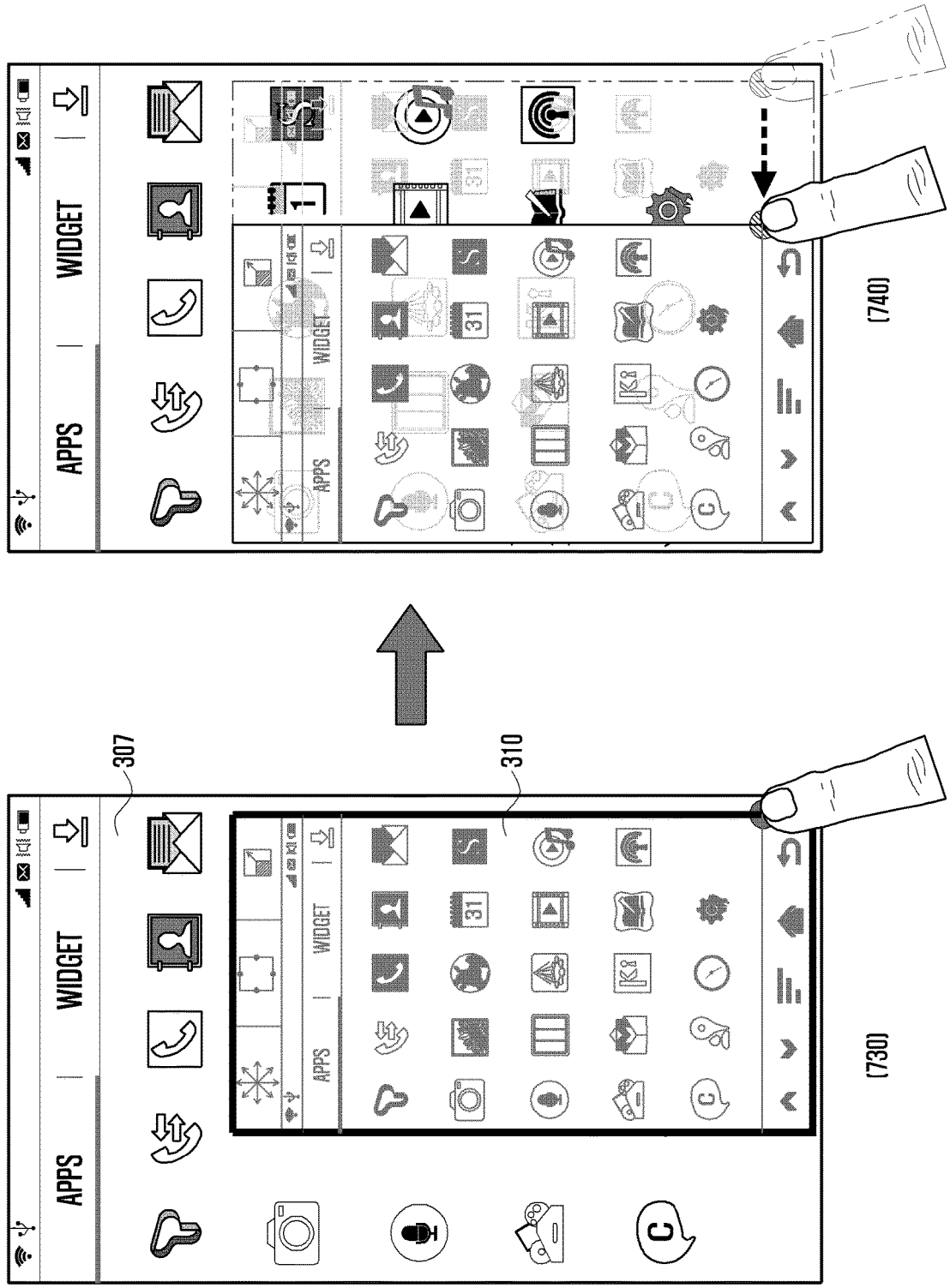

The change of setup such as the size and location of the mirror image 310 will be described in detail with reference to FIGS. 6A to 6B and 7A to 7B. FIGS. 6A and 6B illustrate the change of setup of an opaque mirror image according to an embodiment of the present invention. FIGS. 7A and 7B illustrate the change of setup of a translucent mirror image according to an embodiment of the present invention. Here, the procedure of changing the setup of the mirror image, as described below, may not be related to the transparency of the mirror image. That is, the change of setup of the opaque mirror image may follow the procedure shown in FIGS. 7A and 7B.

A picture 610 of FIG. 6A shows a screen on which the mirror image 310 is displayed under the mini-mode of the portable device 100. The mirror image 310, which is opaque, is displayed together with a dark background image. Also, the outer key icons 311 and the setup change icons 312 are displayed at the bottom portion and the upper portion of the mirror image 310, respectively. Also, the setup change icons 312 includes a movement key 611 for changing the location of the mirror image 310, a size adjustment key 612 for adjusting the size of the mirror image 310, and a mini-mode deactivation key 613 for deactivating the mini-modes and allowing the original image only to be displayed. When the size adjustment key 612 is selected in the picture 610, an image adjustment box 621 is displayed on the border of the mirror image 310 as shown in a picture 620. The image adjustment box may be provided with adjustment points for adjusting the size of the image at the center of each line and the corners. A picture 630 illustrates that the mirror image 310 is being enlarged by selecting one of the adjustment points displayed on the image adjustment box 621. The user may change the size of the mirror image 310 by adjusting the size of the image adjustment box 621 as above. In the same way, the user may reduce the size of the mirror image 310 by reducing the size of the image adjustment box 621.

FIG. 6B illustrates the change of location of the mirror image. A picture 640 shows the mirror image 310 located at the lower right corner on the screen. Also, the movement key 611 is displayed on the upper leftmost portion of the mirror image 310. A picture 650 of FIG. 6B illustrates a user's gesture of selecting the movement key 611 and moving toward the upper end of the screen. When the touch on the movement key 611 is detected and the touch continues to move in a predetermined direction, the control unit 150 may change the location of the mirror image 310 to be thereby displayed as shown in a picture 660. Also, the picture 660 shows that the user is moving the finger touching the movement key 611 to the left of the screen. In this case, the mirror image 310 may be moved and displayed at the upper left corner according to the movement of user's touch as shown in a picture 670. At this time, the outer key icons 311 displayed at the bottom of the mirror image 310 may be rearranged in order according to the location (e.g., the left and right of the screen) of the mirror image 310. The outer key icons 311 may be rearranged in a manner that the menu key, the home key and the back key, which are frequently used, are positioned to be close to user's hand. That is, when the mirror image 310 is located on the right of the screen as in the pictures 640 to 660, the outer key icons 311 may be displayed in order that the volume key, the menu key, the home key and the back key are positioned one by one from the left to the right. Contrarily, when the mirror image 310 is located on the left of the screen as in the picture 670, the outer key icons 311 may be displayed in order that the back key, the home key, the menu key and the volume key are positioned one by one from the left to the right.

FIG. 7A illustrates a screen where the original image 307 is overlaid with the translucent mirror image 310. In this way, the mirror image 310 is displayed to overlay the original image 307. A picture 710 of FIG. 7A shows a user's gesture of touching a corner point 711 and dragging. When a user's touch input on the mirror image 310 for reduction of size is input, the mirror image 310 is displayed in a reduced size. The touch gesture for reducing the size of the mirror image 310 is implemented by touching the corner point 711 of the original mirror image 310 and dragging along a diagonal line of the mirror image 310 toward the center of the screen. Also, the reduced size of the mirror image 310 is fixed by removing the user's touch. Here, the mirror image 310 is reduced in size to be proportional to the distance between the original corner point 711 and the moved corner point 722.

The mirror image 310 may be enlarged by touching and dragging the corner point of the mirror image 310 like the reduction of the mirror image 310. Also, the touch gesture for enlargement may be implemented by touching the corner point of the mirror image 310 and dragging along a diagonal line of the mirror image 310 in a direction opposite to the center of the screen. The enlarged size of the mirror image 310 may be fixed by removing the user's touch.

FIG. 7B illustrates a screen where the original image 307 is overlaid with the translucent mirror image 310. In this way, the mirror image 310 is displayed to overlay the original image 307. When a user's touch on the mirror image 310 for movement is input as shown in a picture 730 of FIG. 7B, the mirror image 310 is relocated to be thereby displayed as shown in picture 740. The touch gesture for movement of the mirror image 310 may be, for example, a drag. The touch gesture of dragging for movement of the mirror image 310 may be confined to gestures generated on the border 731 of the mirror image 310, in order to make it different from the touch gesture (e.g., a drag that induces the movement of screen) for performing general functions on the mirror image 310. The touch gesture for movement of the mirror image 310 may be implemented by touching the border 731 of the mirror image and then dragging in the direction to which the mirror image 310 is to be moved. Referring to a picture 740 of FIG. 7B, the user touches the border of the mirror image 310 located at the right side, and drags it to the left, so that the mirror image 310 is relocated to the left corner. Also, the relocated mirror image 310 is fixed by removing the user's touch.

Figure 8:
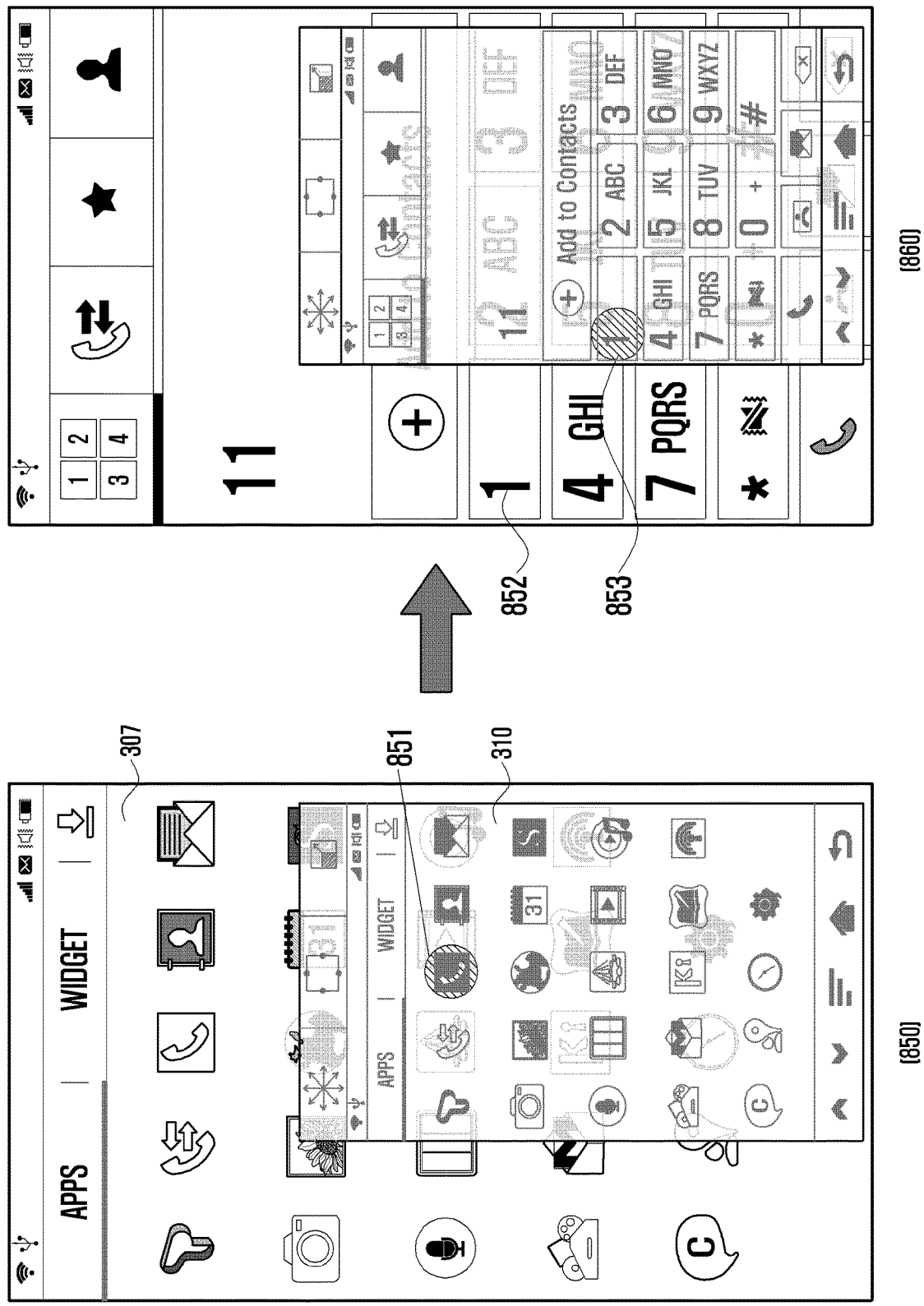
FIG. 8 illustrates performing a function in a mini-mode according to an embodiment of the present invention.

FIG. 8 illustrates performing a function in the mini-mode according to an embodiment of the present invention.

A picture 850 of FIG. 8 shows that the translucent mirror image 310 is displayed on the partial area of a touch screen in the mini-mode. The mirror image 310 has the same arrangement of applications and widgets as those of the original image 307 to facilitate a user's touch input. When a certain application on the mirror image 310 is touched, the control unit 150 may identify the selection of the application. In the picture 850, the control unit 150 identifies that a phone application 851 has been selected by the user's input. In this case, both the original image 307 and the mirror image 310 display the same result of performance of the phone application as shown in a picture 860 of FIG. 8. In addition to the performance of an application, the input of letters, numbers and symbols of the performed application may be achieved by a touch input on the mirror image 310. When the phone application is performed as shown in the picture 860, the control unit 150 may display a reduced dial pad on the mirror image 310. Also, the control unit 150 may detect a dial input upon a user's touch on the reduced dial pad of the mirror image 310, and may display the dialed number in a display field of the original image 301 and the mirror image 310. For example, when the user touches a number "1" as indicated by reference numeral 853 on the mirror image 310 of the picture 860, the control unit 150 displays the number "1" in the display field, as if the number "1" of the original image is touched. Selecting and performing the phone application in the mirror image 310 has been described with reference to the drawings here. However, it should be understood that the functions performed in the mirror image 310 may include various examples such as termination of an application, a change in location of icons, a movement of a screen, etc., as well as performing applications.

Although the method and the apparatus for managing the audio data of the electronic device according to the embodiments of the present invention have been described through the specification and drawings by using the specific terms, the embodiments and the terms are merely used as general meanings to easily describe technical contents of the present invention and assist understanding of the present invention, and the present invention is not limited to the embodiments. That is, it is apparent to those skilled in the art that other various embodiments based on the technical idea of the present invention can be implemented.

While the present invention has been particularly shown and described with reference to certain embodiments thereof, various changes in form and detail may be made therein without departing from the spirit and scope of the present invention as defined by the following claims. Accordingly, the scope of the present invention will be defined by the appended claims and equivalents thereto.

What is claimed is:

1. A method for a portable device having a touch display, comprising:
    displaying an original-view screen on the touch display, the original-view screen comprising one or more icons, wherein, when one of the one or more icons is selected, a function corresponding to the selected icon is performed;
    receiving an input event for activating a mini-view screen, and, in response to the input event for activating the mini-view screen being received, displaying the mini-view screen at a location adjacent to a side edge of the touch display, wherein the mini-view screen comprises a reduced version of the original-view screen, a region comprising at least one row including one or more GUI items, and wherein the reduced version of the original-view screen comprises one or more reduced version icons corresponding to the one or more icons;
    detecting an input event for selecting one of the one or more reduced version icons, and, in response to the input event for selecting one of the one or more reduced version icons being detected, performing a function corresponding to the selected reduced version icon, wherein the at least one reduced version icon is corresponding to the at least one icon of the original-view screen and included in the reduced version of the original-view screen;
    performing specific media data on the portable device, and, in response to the specific media data being performed, temporarily deactivating display of the mini-view screen and re-activating the mini-view screen when performance of the specific media data terminates;
    detecting that an orientation of the portable device is changed from a portrait orientation to a landscape orientation while the mini-view screen is displayed, and, in response to the orientation change being detected, temporarily deactivating display of the mini-view screen and displaying the original view screen corresponding to the landscape orientation; and
    detecting that an orientation of the portable device is changed from the landscape orientation to the portrait orientation while the original-view screen corresponding to the landscape orientation is displayed, and, in response to the orientation change being detected, re-activating the mini-view screen.

2. The method of claim 1, wherein the region comprises a first row displayed at a top of the mini-view screen and a second row region is displayed at a bottom of the mini-view screen.

3. The method of claim 2, further comprising:
    when an input event for changing location of the mini-view screen is detected, allowing the mini-view screen mini-mode window to be movable around the touch display by a subsequent drag event.

4. The method of claim 3, wherein the input event for changing location of the mini-view screen comprises an input event in at least part of the region of the mini-view screen, and wherein the subsequent drag event maintains contact with the at least part of the region.

5. The method of claim 3, wherein the input event for changing location of the mini-view screen comprises a touch gesture event of dragging across a distance of the touch display.

6. The method of claim 2, wherein the one or more GUI items of the second row comprises a home key item and a back key item, and the one or more GUI items of the first row comprises a size-adjustment key item.

7. The method of claim 6, wherein when an input event selecting the size adjustment key item of the first row is detected, allowing the mini-view screen to be changed in size by a drag event starting on a frame of the mini-view screen and proceeding in a direction of size reduction or enhancement.

8. The method of claim 1, wherein, while the mini-view screen is displayed on the touch display, the portions of the touch display not displaying the mini-view screen are blank.

9. The method of claim 1, wherein the mini-view screen is at least one of opaque and translucent.

10. The method of claim 1, wherein at least one function corresponding to the one or more icons, or to their respective one or more reduced version icons, comprises at least one of terminating an application and executing an application.

11. The method of claim 1, wherein the input event for displaying the mini-view screen comprises a preset dragging touch gesture which satisfies a determined movement speed limit.

12. The method of claim 1, wherein, when the portable device detects that the orientation of the portable device is changed from the landscape orientation to the portrait orientation, returning to the display of the mini-view screen.

13. A portable device, comprising:

a touch display which receives input, displays an original-view screen, the original-view screen comprising one or more icons which, when selected, perform a corresponding function, and displays a mini-view screen; and one or more processors which:

when an input event for activating the mini-view screen is detected, control the touch display to display the mini-view screen at a location adjacent to a side edge of the touch display, wherein the mini-view screen comprises a reduced version of the original-view screen, a region comprising at least one row including one or more GUI items, and wherein the reduced version of the original-view screen comprises one or more reduced version icons corresponding to the one or more icons;

when an input event for selecting one of the one or more reduced version icons is detected, perform a function corresponding to the selected reduced version icon, wherein the at least one reduced version icon is corresponding to the at least one icon of the original-view screen and included in the reduced version of the original-view screen;

when specific media data is performed on the portable device, temporarily deactivate display of the mini-view screen and re-activate the mini-view screen when performance of the specific media data terminates;

when detecting that an orientation of the portable device is changed from a portrait orientation to a landscape orientation while the mini-view screen is displayed, temporarily deactivate display of the mini-view screen and display the original-view screen corresponding to the landscape orientation; and when detecting that an orientation of the portable device is changed from the landscape orientation to the portrait orientation while the original-view screen corresponding to the landscape orientation is displayed, re-activate the mini-view screen.

14. The portable device of claim 13, wherein, while the mini-view screen is displayed on the touch display, portions of the touch display not displaying the mini-view screen are blank.

15. The portable device of claim 13, wherein the mini-view screen is at least one of opaque and translucent.

16. The portable device of claim 13, wherein at least one function corresponding to the one or more icons, or to their respective one or more reduced version icons, comprises at least one of terminating an application and executing an application.

17. The portable device of claim 13, wherein the input event for displaying the mini-view screen comprises a preset dragging touch gesture which satisfies a determined movement speed limit.

18. The portable device of claim 13, wherein an input event for changing location of the mini-view screen comprises a touch gesture event of dragging across a distance of the touch display.

19. The portable device of claim 13, wherein the region comprises a first row displayed at a top of the mini-view screen and a second row region is displayed at a bottom of the mini-view screen.

20. The portable device of claim 19, wherein the one or more processors, when an input event for changing location of the mini-view screen is detected, allow the mini-view screen to be movable around the touch display by a subsequent drag event.

21. The portable device of claim 20, wherein the input event for changing location of the mini-view screen comprises an input event in at least part of the region of mini-view screen, and wherein the subsequent drag event maintains contact with the at least part of the region.

22. The portable device of claim 19, wherein the one or more GUI items of the second row comprise a home key item and a back key item, and the one or more GUI items of the first row comprise a size-adjustment key item.

23. The portable device of claim 22, wherein the one or more processors, when an input event selecting the size adjustment key item of the first row is detected, allow the mini-view screen to be changed in a size by a drag event starting on a frame of the mini-view screen and proceeding in a direction of size reduction or enhancement.

24. A portable device, comprising:

a touch display; and one or more processors configured to cause the portable device to:

display an original-view screen, the original-view screen comprising one or more icons;

when an input event for selecting one of the one or more icons of the original-view screen is detected, perform a function corresponding to the selected icon;

when an input event for activating a mini-view screen is detected, display the mini-view screen at a location adjacent to a side edge of the touch display, wherein the mini-view screen comprises a reduced version of the original-view screen and a region comprising at least one row including one or more GUI items, and wherein the reduced version of the original-view screen comprises one or more reduced version icons corresponding to the one or more icons;

when an input event for selecting one of the one or more reduced version icons of the mini-view screen is detected, perform a function corresponding to the selected one reduced version icon, wherein the at least one reduced version icon is corresponding to the at least one icon of the original-view screen and included in the reduced version of the original-view screen;

when specific media data is performed on the portable device, temporarily deactivate display of the mini-view screen and re-activate the mini-view screen when performance of the specific media data terminates;

when detecting that an orientation of the portable device is changed from a portrait orientation to a landscape orientation while the mini-view screen is displayed, temporarily deactivate display of the mini-view screen and display the original-view screen corresponding to the landscape orientation; and when detecting that an orientation of the portable device is changed from the landscape orientation to the portrait orientation while the original-view screen corresponding to the landscape orientation is displayed, re-activate the mini-view screen.

25. The portable device of claim 24, wherein the one or more processors, when an input event for changing location of the mini-view screen is detected, allow the mini-view screen to be movable around the touch-display by a subsequent drag event.

26. The portable device of claim 24, wherein the one or more processors, when an input event selecting a size adjustment key item of the mini-view screen is window is detected, allow the mini-view screen to be changed in size by a drag event starting on a frame of the mini-view screen and proceeding in a direction of size reduction or enhancement.

27. The portable device of claim 24, wherein an input event for moving the mini-view screen comprises an input event in at least part of the region of the mini-view screen, and wherein the mini-view screen is movable around the touch display by a subsequent drag event in which the at least part of the region moves on the touch display, maintaining its contact with the dragging touch input.

28. The portable device of claim 24, wherein an input event for moving the mini-view screen comprises a touch gesture event of dragging across a distance of the touch display.

29. The portable device of claim 24, wherein, while the mini-view screen is displayed on the touch display, portions of the touch display not displaying the mini-view screen are blank.

30. The portable device of claim 24, wherein the mini-view screen is at least one of opaque and translucent.

31. The portable device of claim 24, wherein at least one function corresponding to the one or more icons, or to their respective one or more reduced version icons, comprises at least one of terminating an application and executing an application.

32. The portable device of claim 24, wherein an input event for displaying the mini-view screen comprises a preset dragging touch gesture which satisfies a determined movement speed limit.

* * * * *